United States Patent [19]
Wood et al.

[11] Patent Number: 5,569,902
[45] Date of Patent: Oct. 29, 1996

[54] CONTACT TWO-DIMENSIONAL BAR CODE READER HAVING PRESSURE ACTUATED SWITCH

[75] Inventors: Robert J. Wood, Syracuse; Michael J. Pileski, Skaneateles, both of N.Y.

[73] Assignee: Welch Allyn, Inc., Skaneateles Falls, N.Y.

[21] Appl. No.: 373,656

[22] Filed: Jan. 17, 1995

[51] Int. Cl.⁶ ............................................. G06K 7/10
[52] U.S. Cl. ..................... 235/472; 235/462; 235/438; 235/483; 235/455
[58] Field of Search .................................. 235/472, 462, 235/438, 483, 455

[56] References Cited

U.S. PATENT DOCUMENTS

| | | | |
|---|---|---|---|
| 4,107,540 | 8/1978 | Hillman | 250/566 |
| 4,210,802 | 7/1980 | Sakai | 235/483 |
| 4,282,425 | 8/1981 | Chadima, Jr. et al. | 235/462 |
| 5,285,056 | 2/1994 | Tedesco et al. | 235/438 X |
| 5,331,176 | 7/1994 | Sant'Anselmo et al. | 235/472 X |

FOREIGN PATENT DOCUMENTS

| | | |
|---|---|---|
| 56-153482 | 11/1981 | Japan. |
| 6-266876 | 9/1994 | Japan. |

*Primary Examiner*—Donald T. Hajec
*Assistant Examiner*—Michael G. Lee
*Attorney, Agent, or Firm*—Harris Beach & Wilcox

[57] ABSTRACT

A contact bar code reader is suitable for reading 2-dimensional bar codes. The reader comprises a housing having therein a source of illumination and optics for producing a diverging beam for illuminating a bar code symbol. A transparent frustoconical guide is removably attached to the housing, and has an conical angle corresponding to the beam's angle of divergence. The guide is dimensioned to encompass the bar code symbol, and its line of contact with the data carrier is substantially fully visible to the operator, who can thus confirm that the guide is in proper operating position relative to the bar code symbol prior to initiating a reading operation. A reading operation can be initiated by pressing on the guide to actuate a switch, or on a manual trigger.

9 Claims, 5 Drawing Sheets

CONTACT TWO-DIMENSIONAL BAR CODE READER HAVING PRESSURE ACTUATED SWITCH

BACKGROUND OF THE INVENTION

1. Field of the Invention

This invention relates to a bar code reader for two-dimensional bar code symbologies. More particularly this invention relates to an improvement for positioning a two-dimensional bar code scanner in alignment with the symbol to be read such that the scanner's optics are at an optimum distance therefrom.

2. Description of the Prior Art

Two dimensional bar code symbols are now common in the art. Symbologies such as PDF417 are characterized by multiple rows of data that in aggregate contain encoded information. Usually redundant information is included for error detection and correction. PDF417 is described in Wang, U.S. Pat. No. 5,243,655. Other two-dimensional symbologies are known. For example, Allais, U.S. Pat. No. 4,794,239 discusses stacked linear bar codes, and proposes a multi track symbology.

Known bar code reading devices are capable of reading symbols even when the scanning axis of the reader is not rotationally aligned with the rows and columns. In the case of PDF417, this can be accomplished by "scan stitching", which utilizes positional information that is encoded in each row to identify a given row being scanned. Another approach, described in European Patent Application EP 0 385 478, involves transferring the optical pattern into a memory, and then evaluating the contents of the memory to determine the angular orientation of the symbol. Nevertheless it is more efficient to read the symbol in alignment with the active optical elements in the scanning device.

It is desirable to operate portable bar code scanners with light sources that consume low power, such as light emitting diodes. These devices have carefully optimized optical systems for creating an illuminating beam with sufficient angular divergence to read a bar code symbol that is wider than the optical window of the scanner, yet limit off-angle falloff of illumination to acceptable limits. Such scanners cannot be positioned too far from the symbol and still read effectively. Also, they often do not tolerate deviation of the scanner's optical axis from a normal to the surface of the target, because the working depth of field is intentionally kept small, in order to take advantage of the limited illumination available.

Sakai, U.S. Pat. No. 4,210,802, discloses a scanner in which two parallel guide rails appended to the front of the housing are proposed to define a scanning region for the image sensor. Parallel top and bottom walls are provided to enable the operator to visualize the symbol. This arrangement could assists the reading of linear bar code symbols, but would be inconvenient for use with a two-dimensional symbol, as the operator would not have a ready 360° view of the symbol's borders.

SUMMARY OF THE INVENTION

It is therefore a primary object of the present invention to provide an improved bar code scanner for two dimensional symbologies that provides a positional and directional indicator to the operator that the scanner is properly positioned and directed with respect to the symbol being read.

It is another object of the present invention the provide an actuator for the bar code reader that cooperates with the positional and directional indicator to initiate a reading operation.

These and other objects of the present invention are attained by an optical reader of the type having a source of illumination, a photodetector, transmission optics for directing light emanating from the source onto a data carrier having indicia distributed in a substantial length dimension and width dimension thereof, and receive optics for directing light returning from the indicia onto the photodetector. The reader comprises a housing having therein a source of illumination for producing a beam for illuminating a data carrier having indicia thereon; optics for diverging the beam outward of the housing; and a transparent guide disposed on a front portion of the housing. The guide is frustoconical, having walls that diverge from the housing in parallel with marginal rays of the beam and proximate thereto, so that the walls of the guide fully encompass the marginal rays. The guide is dimensioned to enclose the indicia when its front end is placed in contact with the data carrier, and its line of contact with the data carrier is substantially fully visible to an operator whose eye is disposed behind the housing. The operator can thus confirm that the guide is in proper operating position relative to the indicia prior to initiating a reading operation.

In one aspect of the invention a switch engages when the guide is pressed against the data carrier to initiate a reading operation. The switch can also actuate the source of illumination.

In another aspect of the invention, the guide is removable from the housing, and can be interchanged with an alternate guide that is dimensioned to surround different indicia.

In yet another aspect of the invention the optics comprise a plurality of lenses selectably disposed on a wheel, the lenses having differing optical characteristics and diverge the beam at different angles in order to conform to the conical angle of the alternate guide.

BRIEF DESCRIPTION OF THE DRAWING

For a better understanding of these and other objects of the present invention, reference is made to the detailed description of the invention which is to be read in conjunction with the following drawings, wherein.

DESCRIPTION OF THE PREFERRED EMBODIMENT

Figure 1:
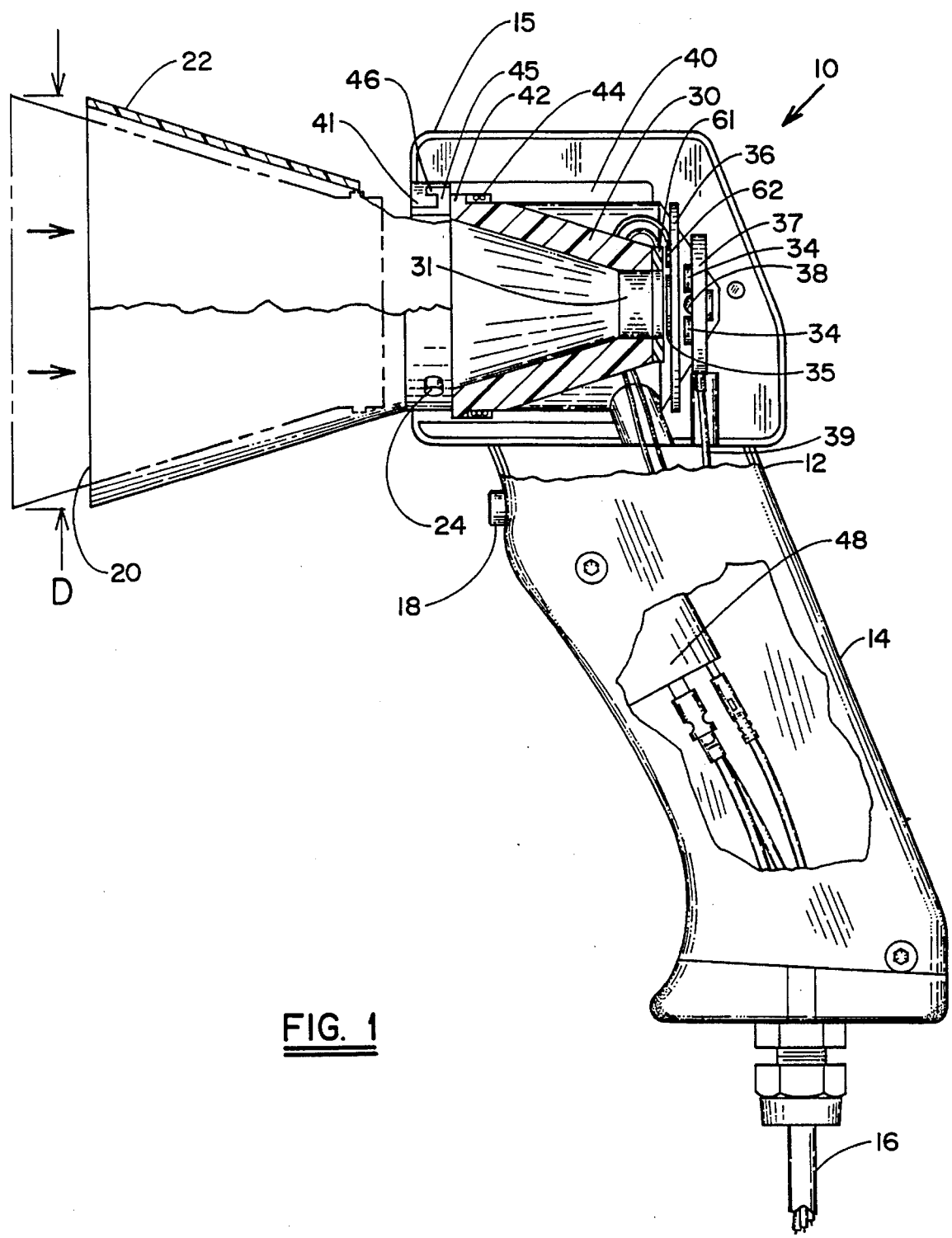
FIG. 1 is a composite side view of a bar code scanner embodying the teachings of the invention.
Figure 2:
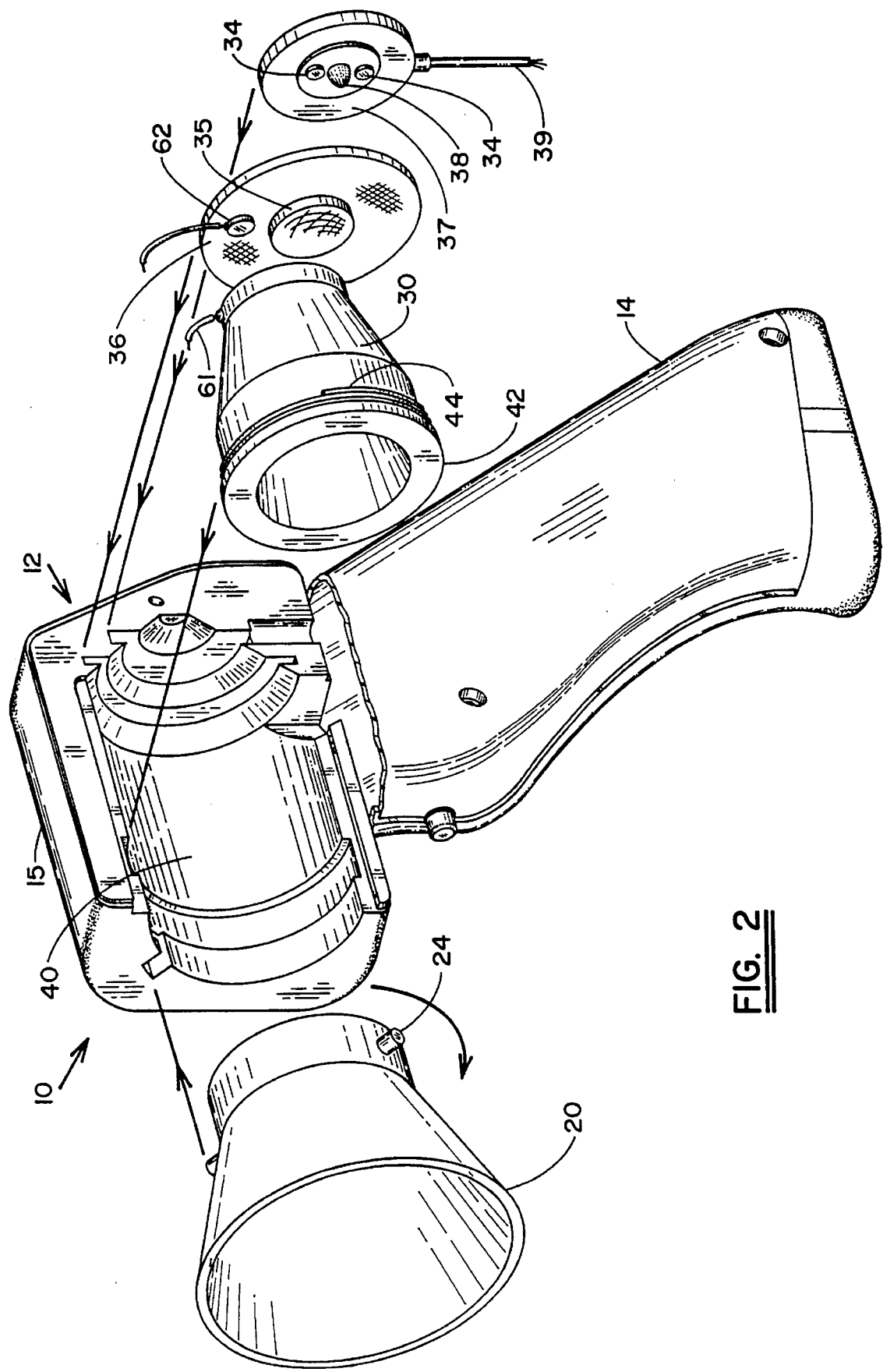
FIG. 2 is a perspective view, partially exploded, of the scanner shown in FIG. 1.

Turning now to the drawing, and in particular to FIGS. 1 and 2 thereof, there is shown a hand-held optical reader 10. The reader has a housing 12, which includes a hand-grip 14, and a reader head 15. A depressible switch 18 is provided on the front of the hand-grip 14, which actuates the device when depressed by an operator's finger. A cable 16 attaches to the base of the hand-grip 14 for supplying power and for transmission of signals between the reader and a host device (not shown), which can be a point-of-sale terminal, or a computer.

An assembly 37 is disposed in the rear of the reader head 15. Mounted thereon is a light source 38 which can be a microlaser or the like, and one or more photodetectors 34, which must be optically shielded from the light source 38. Shielding can be accomplished by suitable opaque thin film barriers (not shown) appropriately disposed in the photodetectors, if they are realized as an integrated circuit, or by an appropriate configuration of the laser's containment or lensing system. Alternatively, the light source 38 can be mounted behind the photodetectors 34 to prevent direct transmission of light therebetween. Power and signals are communicated to and from the assembly 37 via a cable 39 leading to suitable signal processing electronics 48, which can include a decoder and a microcomputer. A transceiver, well known in the art, can also be incorporated into the electronics 48, for communication to and from a remote host. In the case where a transceiver is included, then cable 16 will generally be limited to carrying power only, or it could be omitted entirely, and a battery (not shown) placed in the handle portion 14 for supplying power to the unit.

Light emitted by the light source 38 strikes a negative lens 35, which is mounted on a wheel or disk 36. Light exiting the lens 35 continues outwardly through the housing 12 at an angle of divergence. A plurality of lenses can be mounted on the wheel 36, and can be selected in order to achieve a predetermined angle of divergence. The support member 30 is configured as a frustum of a cone, having a small rear end disposed proximate the lens 35, and a wide front end disposed near the front of the reader head 15. An optical element 31 can optionally be placed in the rear end of the support member 30 to further adjust the light beam produced by the light source 38 and the lens 35, as may be required. The support member 30 is stabilized by an outer retainer 40, which is mounted in the housing 12.

Figure 6:
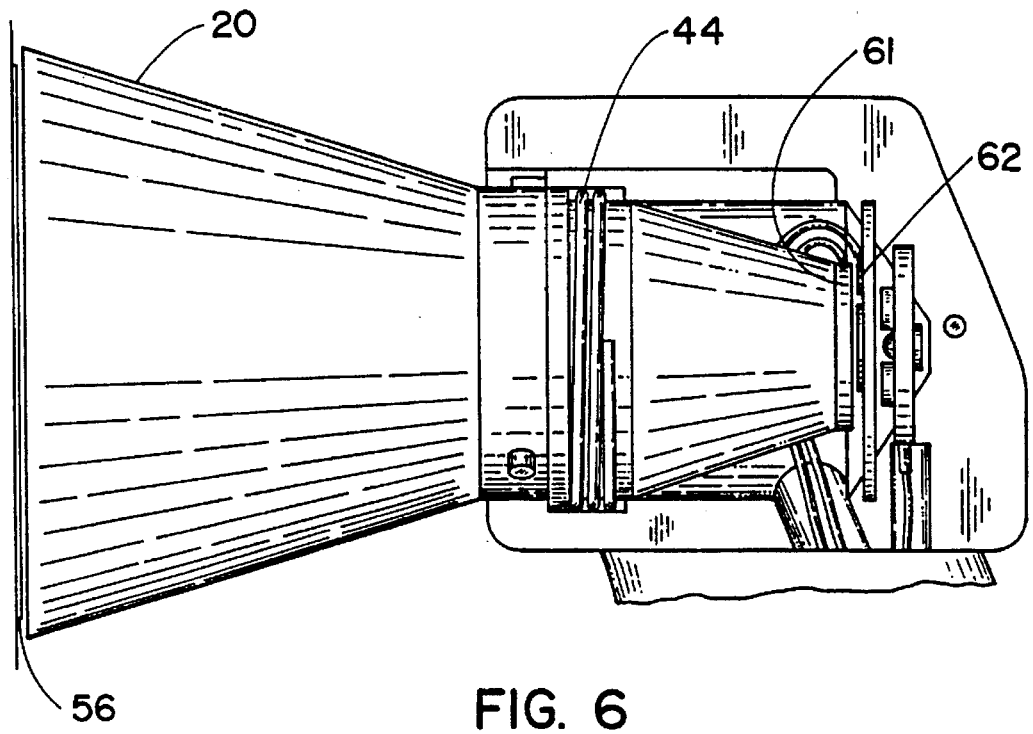
FIGS. 6 and 7 are enlarged cut-away side views of the reader head of FIG. 1, showing the cone assembly in extended and retracted positions respectively.
Figure 7:
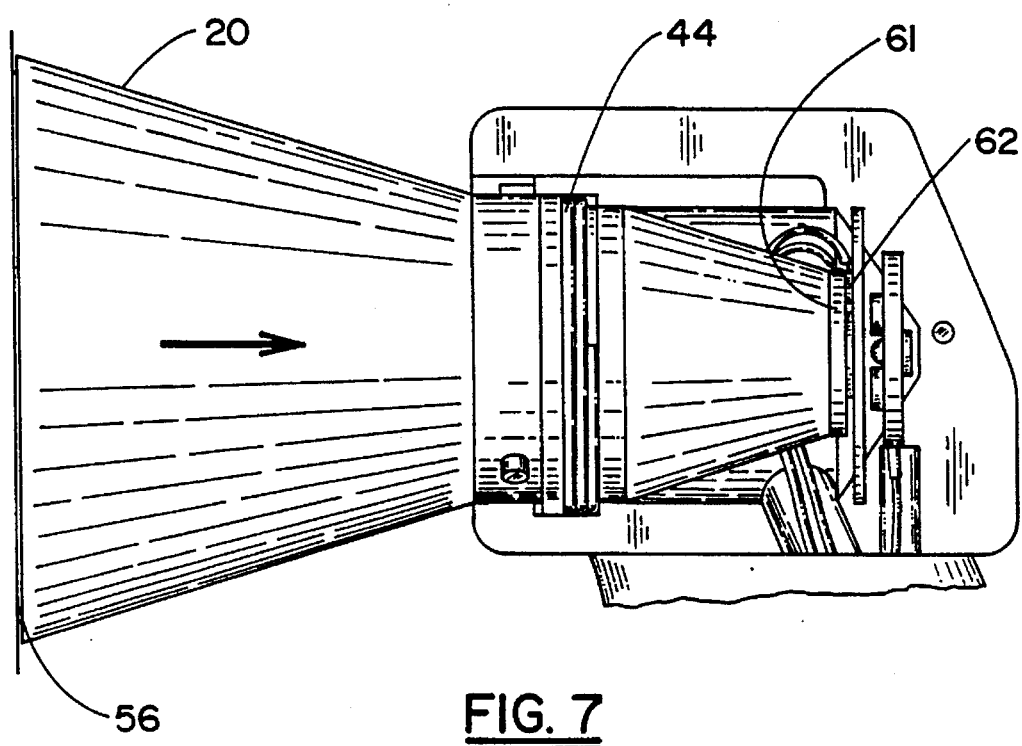

A transparent guide 20 is disposed on the front portion of the reader head 15. The guide 20 is preferably configured as a frustum of a cone. It removably attaches to the retainer 40 by bayonet pins 24 and is inserted into a bayonet adapter 41 located at the front end of the reader head 15, so that it aligns with the support member 30. The bayonet pins 24 are carried in bayonet tracks 45. A spring 44 disposed in a recess of the retainer 40 bears on a shoulder 42 of the support member 30, urging the support member into forward movement. The support member 30 abuts the bayonet adapter 41, and forces the pins 24 into terminal indents 46 where they are locked in place. The spring 44 also functions to displace the assembled support member 30 and transparent guide 20 in a forward direction, so that the transparent guide 20 is in an extended position with respect to the reader head 15. The guide 20 could also be secured to the reader head 15 by other conventional methods, such as threads, or snap fittings. As best seen in FIGS. 6 and 7, the assembled device can also be actuated by pressing it against a data carrier. In FIG. 6 the guide 20 is disposed near a data carrier 56, and, as a result of the unopposed action of spring 44, is in a fully extended position. In FIG. 7 the guide 20 is applied to the data carrier 56 and is subjected to pressure exerted by an operator (not shown). The force exerted by the data carrier 56 on the cone 20 counteracts the spring 44, and moves the transparent guide and the support member 30 rearward a short distance into the housing 12. Switch contacts 61, 62 disposed on the support member 30 and on a non-movable surface such as disk 36 are thereby brought together to electrically actuate the unit in the same manner as depressible switch 18. The light source 38 is preferably disabled until one of the switches is closed for safety and to conserve power. As is known in the art, other components of the reader can also be enabled and disabled according to the state of the switches, such as the electronics 48, and the photodetectors 34. While actuation of the device is responsive to a mechanical contact switch, it will be understood by those skilled in the art that other types of switches can be substituted for contacts 61, 62. For example optical beam interruption switches could be employed, as could various pressure sensors and proximity sensors using principles such as, for example, change in capacitance. The result in each case is that the device is actuated in response to increased mechanical pressure exerted by the operator pushing the reader against the data carrier.

Figure 3:
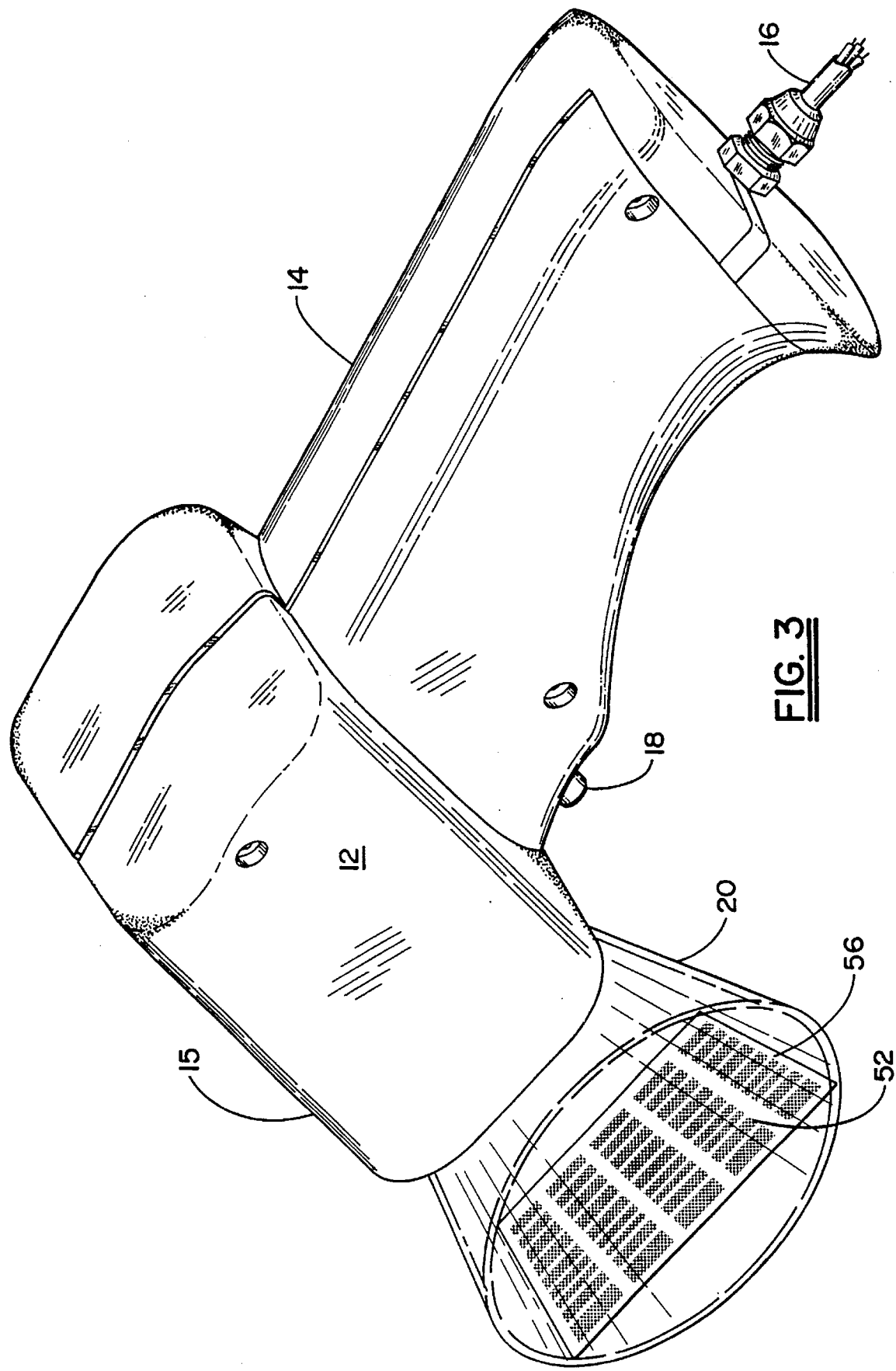
FIG. 3 is a perspective view of the scanner shown in FIG. 1 in a operating position confronting a bar code symbol.

Referring now to FIG. 3, the transparent guide 20 extends outwardly of the housing 12, and is dimensioned to encompass a symbol 52 of predetermined type when the transparent guide 20 is placed on a data carrier 56. The symbol can be, for example, a two-dimensional bar code symbol.

Figure 4:
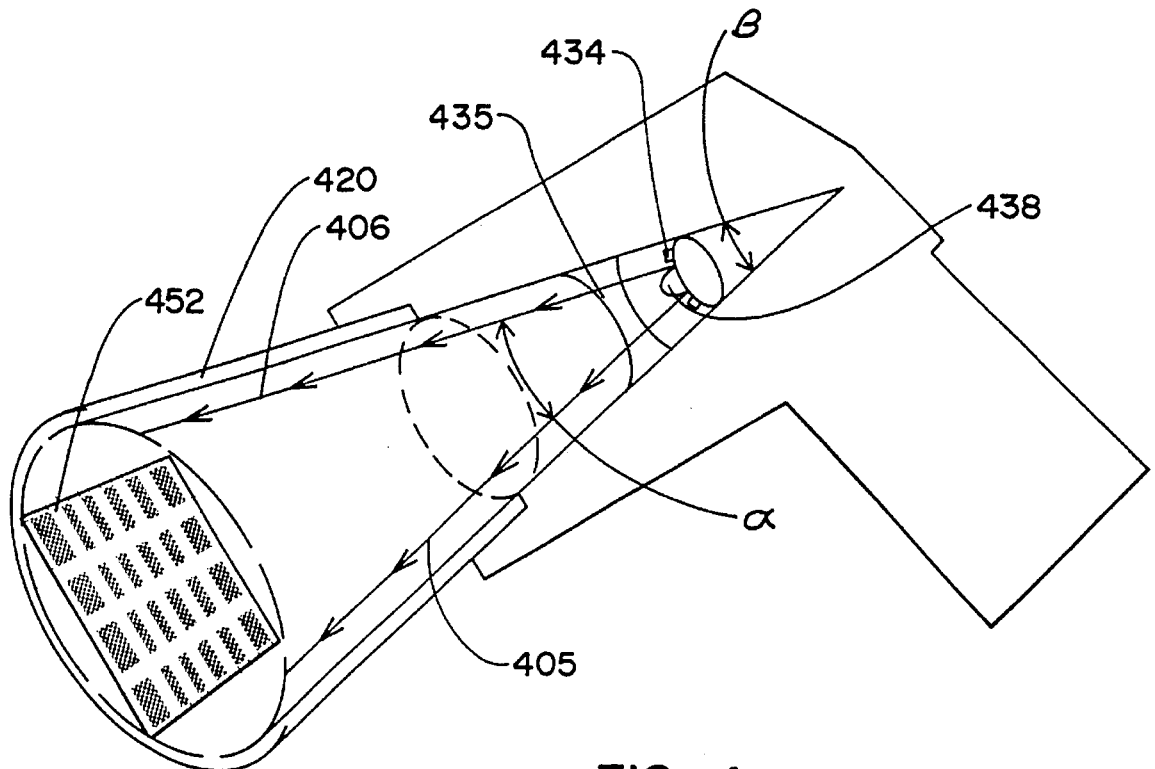
FIG. 4 is a diagrammatic sectional view, with detail omitted, taken through line 4—4 of FIG. 1.
Figure 5:
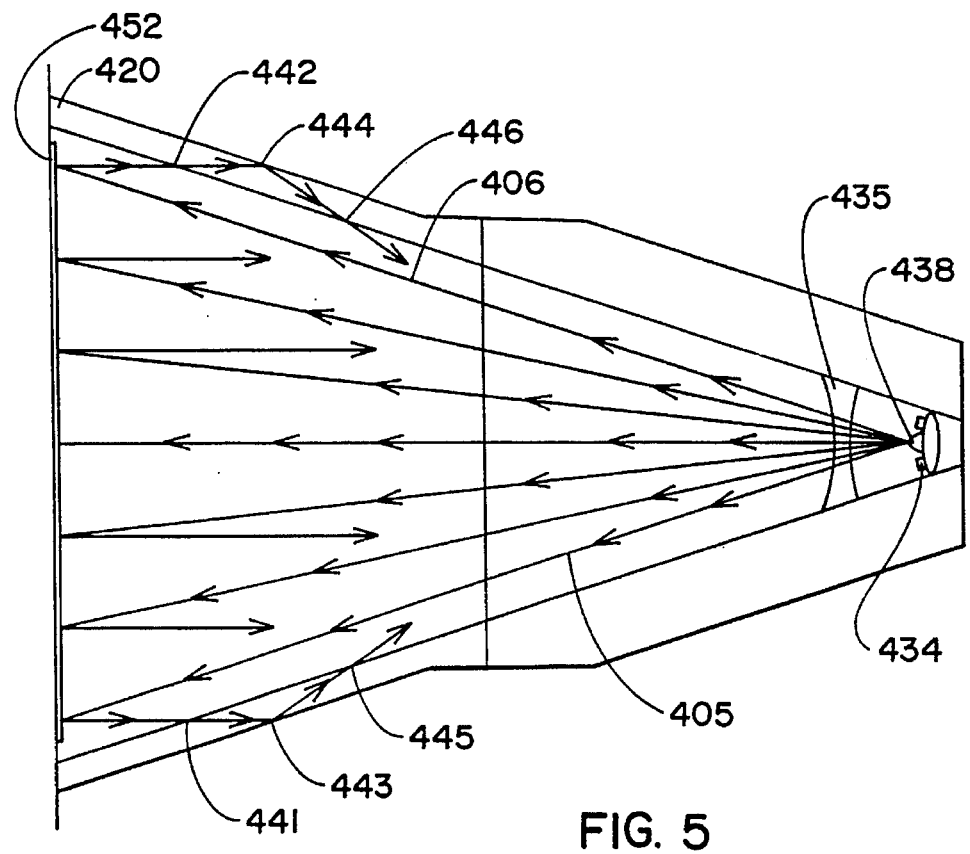
FIG. 5 is an diagrammatic illustration that is helpful in understanding the operation of a scanner in accordance with the invention.

Turning now to FIG. 4 there is shown a diagram illustrating the function of a transparent guide 420 which is configured as the frustum of a cone, and placed on a data carrier 452. Light radiation emitted by a laser source 438 emerges from a negative lens 435 at an angle of divergence $\alpha$ that is equal to the conical angle $\beta$ of the frustum. This laser can be of any suitable type; a 660 nm laser is suitable. The guide 420 is constructed of a transparent material such as glass or plastic. The source 438 is aligned with the axis of the guide 420, so that the negative lens 435 aligned therewith projects a beam of light that diverges parallel to the walls of the frustum, as shown by marginal rays 405, 406, and it will be evident that the incident beam is fully encompassed by the wall of the guide 420, which is proximate the marginal rays 405, 406. Light incident on the data carrier 452 is scattered in accordance with well known substrate interactions with the data carrier 452, and most of it returns in the general direction of the lens 435, eventually reaching a photodetector 434. In FIG. 5 it will be seen that the incident light rays are scattered in various directions. Some of the scattered rays strike the internal wall of the guide 420, for example at points 441,442 at less than a critical angle, so that the light is internally reflected at points 443, 444 to reenter the interior of the guide at points 445, 446. Only a small amount of light is transmitted through the outer surface of the transparent guide 420. An observer viewing the guide thus sees a dim red glow when the laser is actuated.

Turning again to FIG. 1, it is desirable that the diameter at the front end of the guide 20, indicated by dimension D, exceed the vertical dimension of the reader head 15. Also the diameter preferably exceeds the width dimension of the reader head. The operator, positioned generally behind the reader 10, can thus observe substantially the entire circumference of the front end of the guide 20. Except for the relatively narrow profile of the hand grip 14, the housing 12 does not block the operator's view of the intersection of the front end of the guide 20 with the data carrier. Alternate guides 20 can be provided for reading symbols of different sizes and at different working distances.

To use the device, the operator attaches a suitable guide 20 to the reader head 15, and positions the front end of the guide 20 on a data carrier having a symbol thereon, and holds his/her eyes behind the reader head. While maintaining an essentially stationary position, the operator then views the front end of the guide 20, and confirms that the symbol to be read is fully encompassed within the perimeter of the guide. The reader 10 is then actuated either by depressing the switch 18, or by pressing the device against the data carrier and causing the guide 20 and the support member 30 to retract into the housing and close switch contacts 61, 62 to initiate a reading operation.

While this invention has been explained with reference to the structure disclosed herein, it is not confined to the details set forth and this application is intended to cover any modifications and changes as may come within the scope of the following claims:

What is claimed is:

1. An optical reader of the type having a source of illumination, a photodetector, transmission optics for directing light emanating from the source onto a data carrier having indicia distributed in a substantial length dimension and width dimension thereof, and receive optics for directing light returning from the indicia onto the photodetector, comprising:

a housing having therein a source of illumination for producing a beam for illuminating a data carrier having indicia thereon;

an optical means for directing said beam outward of said housing at an angle of divergence;

a transparent guide disposed on a front portion of said housing, said guide having a front end and walls that diverge from said housing parallel with marginal rays of said beam and proximate thereto, said walls fully encompassing the marginal rays, said guide being dimensioned to enclose the indicia when said front end is placed in contact with the data carrier, wherein a perimeter of said front end is substantially fully visible to an operator having an eye disposed behind the housing; and switch means for actuating said reader to initiate a reading operation when said guide presses on said data carrier;

whereby the operator can confirm that the guide is in proper operating position relative to the indicia.

2. The reader according to claim 1, wherein said switch means is connected to said source of illumination for actuation thereof.

3. The reader according to claim 1 further comprising means for removably attaching said guide to said housing, whereby said guide can be interchanged with an alternate guide that is dimensioned to surround different indicia.

4. The reader according to claim 1, wherein said guide is configured as a frustum of a cone.

5. A hand held optical reader of the type having a source of illumination, a photodetector, transmission optics for directing light emanating from the source onto a data carrier having indicia distributed in a substantial length dimension and width dimension thereof, and receive optics for directing light returning from the indicia onto the photodetector, comprising:

a housing having therein a source of illumination for producing a beam for illumination of a region of the data carrier having indicia thereon; said housing having a hand grip and a reading head, said reading portion having a hand grip and a reading head, said reading portion having a horizontal width dimension and a vertical dimension;

optical means for directing said beam outward of said housing at an angle of divergence;

a transparent guide disposed on a front portion of said housing, said guide having a front end and walls that diverge from said housing parallel with marginal rays of said beam, said walls fully encompassing the marginal rays, said guide being dimensioned to enclose the indicia when said front end is placed in contact with the data carrier, said front end of said guide having a cross-sectional dimension that exceeds said horizontal width dimension and said vertical dimension of said housing; and first switch means responsive to a force exerted thereon by said guide for actuating said reader to initiate a reading operation;

whereby the operator can visualize the indicia enclosed by said guide and confirm that the guide is in proper operating position relative to the indicia.

6. The reader according to claim 5, further comprising second switch means that is manually switched by an operator for actuating said reader.

7. The reader according to claim 5, further comprising means for removably attaching said guide to said housing, whereby said guide can be interchanged with an alternate guide that is dimensioned to surround different indicia.

8. The reader according to claim 7, wherein said optical means are capable of varying said angle of divergence to conform to a conical angle of said alternate guide.

9. The reader according to claim 5, wherein said guide is configured as a frustum of a cone.

* * * * *